E. v. OEFELE.
Steam-Engine.
No. 168,102.
Patented Sept. 28, 1875.
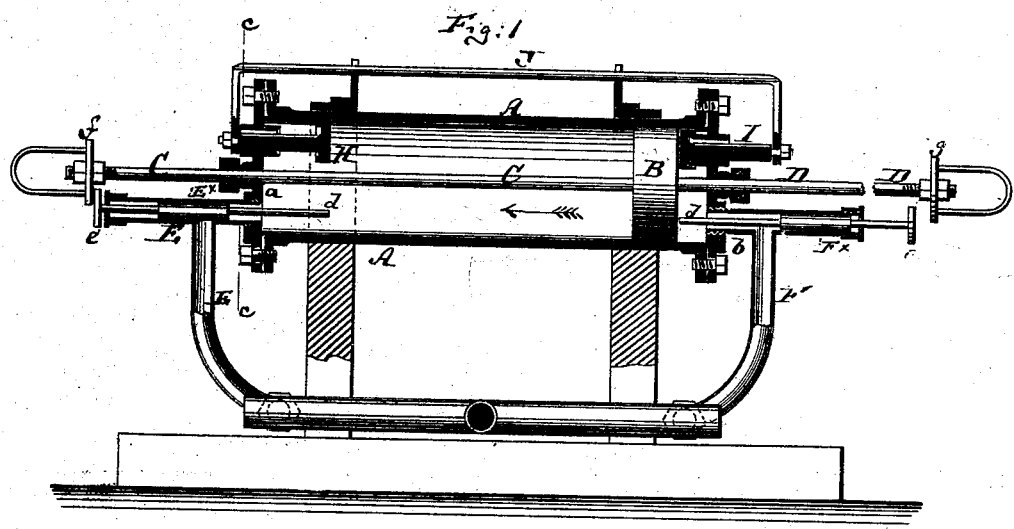
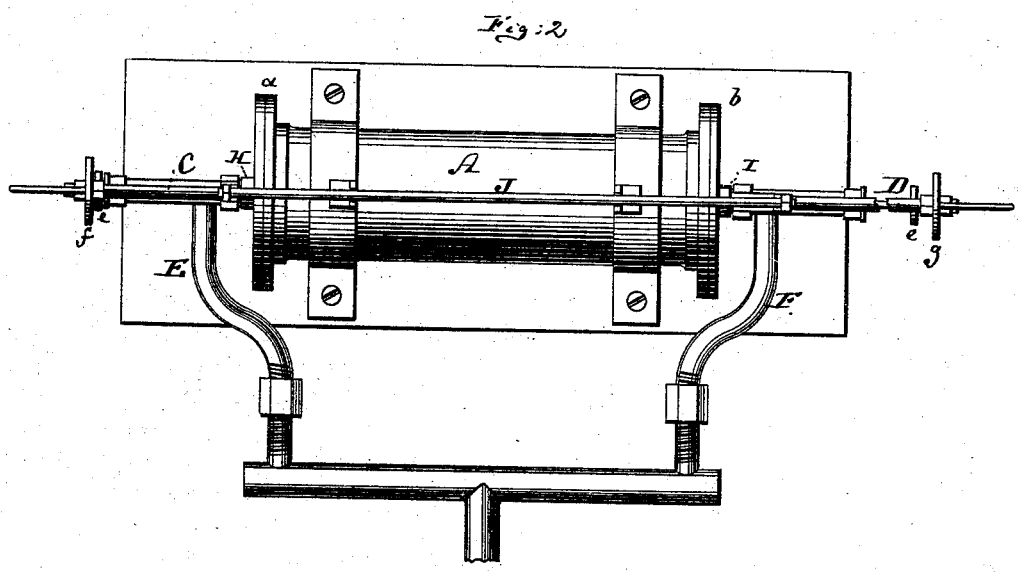
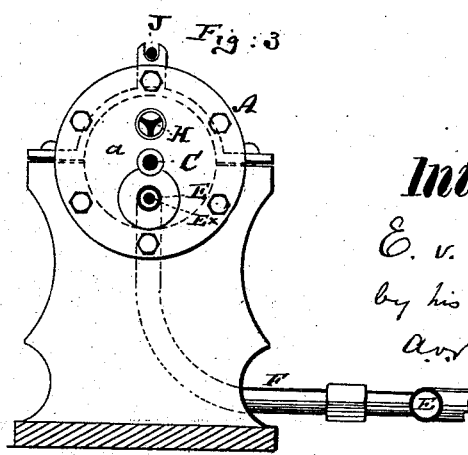
Witnesses:
A. Moraga
F. v. Briesen
Inventor:
E. v. Oefele
by his attorney
A. v. Briesen

UNITED STATES PATENT OFFICE.

EDGAR v. OEFELE, OF MÜNCHEN, GERMANY.

IMPROVEMENT IN STEAM-ENGINES.

Specification forming part of Letters Patent No. 168,102, dated September 28, 1875; application filed September 7, 1875.

*To all whom it may concern:*

Be it known that I, EDGAR V. OEFELE, of München, Germany, have invented a new and Improved Reciprocating Steam-Engine, of which the following is a specification:

Figure 1 is a vertical longitudinal section, and Fig. 2 a top view, of my improved reciprocating steam-engine. Fig. 3 is a vertical transverse section of the same, the line $c\ c$, Fig. 1, indicating the plane of section.

Similar letters of reference indicate corresponding parts in all the figures.

The object of this invention is to produce a reciprocating steam-engine in which the motion of the piston and piston-rod shall be utilized for mechanically regulating the position of inlet and outlet valves, the arrangement of parts being such that provision may be made for using the steam expansively to any desired extent.

My invention consists in the peculiar combination of parts, hereinafter more fully specified.

The letter A in the drawing represents the steam-cylinder. B is the piston fitted therein to slide from one head, $a$, to the other head, $b$, of the cylinder and return, substantially as in every reciprocating steam-engine. The piston has a rod, C, projecting from one end and another piston-rod, D, projecting from the other end, the rod C passing through the head $a$, while the rod D passes through the head $b$ of the cylinder, as shown in the drawing. Suitable stuffing-boxes are provided on the cylinder-heads around the piston-rods. The cylinder A is provided with a steam-inlet pipe, E, which enters the head $a$, and with another steam-inlet pipe, F, that enters the head $b$, as clearly shown in Fig. 1. A piston-valve, $E^x$, is fitted into the inlet-pipe E, and another similar valve, $F^x$, into the inlet-pipe F. A pin, $d$, extends from each of these valves into the body of the cylinder A, and a similar pin extends from the outer end of each of these cylinders through the ends of the respective inlet-pipes, and carries, by preference, a head or enlargement, $e$, as shown in Fig. 1. The two inlet-pipes E and F may be joined to—that is to say, branch from—one single steam-pipe. H and I are the two exhaust-valves, they being fitted into the two heads of the cylinder A respectively, and connected with each other outside of the cylinder by a yoke or rod, J. For the reception of each of these exhaust-valves a cylindrical or other shaped aperture is formed into the respective heads of the cylinders, the body of each valve being made with grooves or otherwise, (see Fig. 3,) so that when one such valve is drawn inward, like the valve H in Fig. 1, the steam may escape from the cylinder through the grooves formed in said valve, and through the socket formed for its reception in the cylinder-head, while, when the valve is moved outward, like the valve I in Fig. 1, its enlarged inner end will close the cylindrical opening or socket in its appropriate cylinder-head, and prevent the escape of steam through such opening or socket. The piston-rod C has at or near its outer end an adjustable or fixed collar, $f$, and the piston-rod D has also, at or near its outer end, an adjustable or fixed collar, $g$. Now, when the piston B is in the position shown in Fig. 1, or is nearest to the cylinder-head $b$, the inlet-pipe F will be opened and the exhaust-valve I closed, while, at the other end of the cylinder, the inlet-pipe E will be closed and the valve H opened. Steam will consequently enter that end of the cylinder which is closed by the head $b$, and cause the piston to move in the cylinder in the direction of the arrow shown in Fig. 1, until, near the end of its stroke, the collar $g$ on the rod D strikes the head $e$ of the valve $F^x$, and thereby closes the inlet-pipe F, so that the remaining part of the stroke of the piston may be effected by the expansion of the steam. The extent to which the steam is used expansively depends upon the distance of the collar $g$ from the piston B. The nearer this collar is set to the piston the sooner will it close the valve $F^x$, and the sooner, consequently, cause the motion of the piston to depend on the fixed quantity of steam contained behind in the cylinder. As the piston B reaches the end of its stroke it strikes the pin $d$ of the valve $E^x$ and opens said valve, and at the same time strikes the exhaust-valve H, closing the same. The closing of the valve H causes the other exhaust-valve I to open, as the two valves are connected by the rod J. By the last-mentioned action of the piston the valve $E^x$ is opened and steam admitted against the opposite side of the piston, and the same caused to move back toward the head $b$, the steam used in the first stroke exhausting through the valve I. By contact of the flange or collar $f$ with the head $e$ of the valve $E^\times$, the inlet-pipe E is closed at the proper time during the return-stroke of the piston, so that the steam may also be used expansibly in the return motion, being the motions toward head $b$, and at the end of the return motion the piston arrives in contact with the valve $F^\times$ and opens the same, and also with the valve I, which it closes, thereby opening H and placing the parts into the same position again in which they are represented in Fig. 1.

I claim as my invention—

The combination of the reciprocating piston B, having the rods C D and the shoulders or collars $f$ $g$ on said rods, respectively, with the cylinder A, having the inlet-pipes E F, inlet-valves $E^\times$ $F^\times$, and the outlet-valves H I, that are connected with each other by the rod J, all substantially as specified, so that the valves shall all be moved by direct contact with the body of the piston, substantially in the manner described.

The foregoing specification of my invention signed by me this 30th day of August, 1875.

E. v. OEFELE.

Witnesses:
ERNEST C. WEBB,
A. MORAGA.